Dec. 28, 1954　　　B. D. BURNS　　　2,697,962
AUTOMATIC SIZING PROJECTOR
Filed Jan. 14, 1952
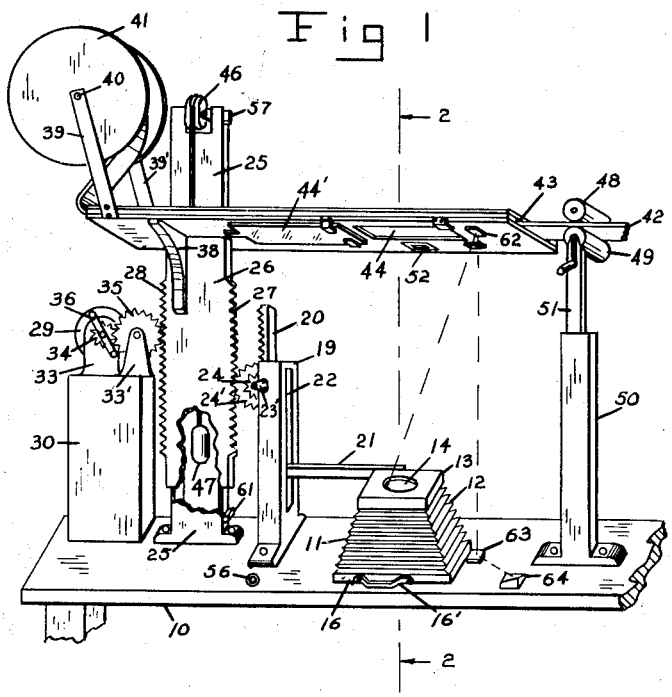
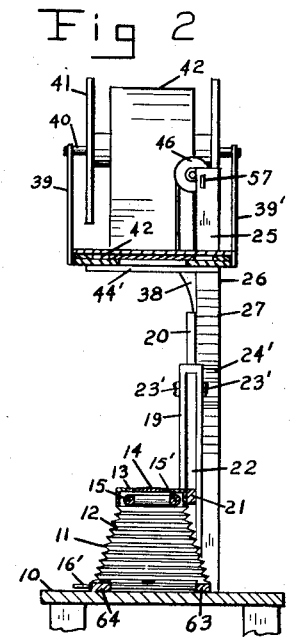
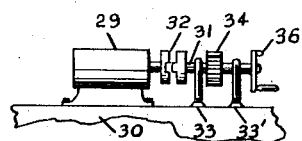
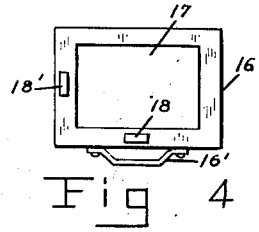
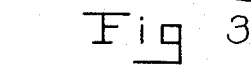
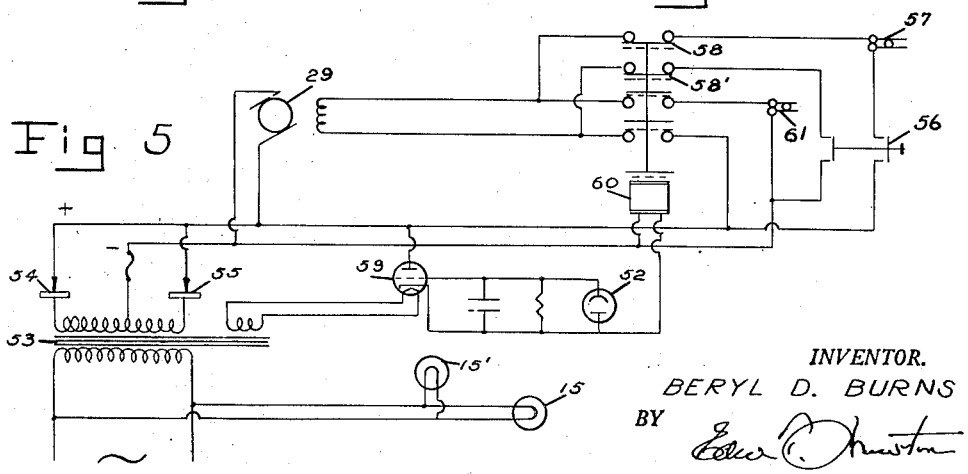
INVENTOR.
BERYL D. BURNS
BY
ATTORNEY

United States Patent Office

2,697,962
Patented Dec. 28, 1954

2,697,962

AUTOMATIC SIZING PROJECTOR

Beryl D. Burns, East Point, Ga.

Application January 14, 1952, Serial No. 266,326

2 Claims. (Cl. 88—24)

This invention relates to an automatic sizing projector, and more particularly to equipment for automatically focusing an image from a positive print upon sensitized paper.

The invention herein disclosed is a continuation-in-part of my co-pending application, Serial No. 187,560, filed September 29, 1951, for "Automatic Focusing Photographic Printer."

Generally, in photography, when it is desired to reprint a photograph from a positive print, a picture is first taken of the print, and the negative thus obtained is reprinted by use of standard equipment. It is often desirable, however, to print from one positive to another positive by projecting the original print on reversal type paper or the like. This process is similar to "photostating" and is done with a device known as an opaque projector.

In the past, opaque projectors have been produced which project an enlarged image of a picture upon sensitized paper; but in order to obtain a fine focus for a given size image, these devices require adjustment of two variables; first, the distance between enlarger and printing surface must be adjusted, and secondly, the focus of the lens must be adjusted. With different size pictures, the enlarger must be readjusted for each size, if prints of uniform size are desired.

Accordingly, it is an object of my invention to provide an opaque projector which will automatically focus to produce a uniform size image regardless of what size original print is used.

Another object of my invention is to provide an opaque projector which may be selectively adjusted either by hand with but one operation or automatically adjusted through use of electronic means.

Another object of my invention is to provide a commercial projector which will reduce the time required to process a large quantity of photographic prints.

Further objects and advantages of my invention will be apparent from the following disclosure when taken in conjunction with the accompanying drawings wherein like characters of reference designate corresponding parts throughout the several views, and wherein:

Fig. 1 is a partially broken perspective view of a balopticon constructed in accordance with my invention.

Fig. 2 is a cross-sectional view taken along line 2—2 in Fig. 1.

Fig. 3 is a view of a detail.

Fig. 4 is a view of a detail.

Fig. 5 is an electrical diagram of the circuit used in my invention.

Referring to the embodiment chosen for purpose of illustration, numeral 10 denotes generally a table which supports the balopticon equipment. Positioned centrally on table 10 is a projector 11 which comprises a bellows 12, lens board 13 and lens 14, all arranged in conventional manner. Numerals 15 and 15' denote generally light sources arranged within the bellows on the lower surface of lens board 14.

As seen in Fig. 1, a print carrier 16 is slidably positioned in conventional manner between table 10 and bellows 12, and is provided with a handle 16' to aid in sliding it in and out of position. Print carrier 16 retains print 17 to be reproduced; and, in addition, carrier 16 is provided with mirrors 18, 18' placed adjacent respective edges of print 17, as shown in Fig. 4, when held in the carrier. Therefore, when the print image is projected, beams of reflected light are always projected at positions adjacent the respective outer edges. It will be understood that print carrier 16 is so arranged and constructed that light from light source 15 can shine down on the print placed in carrier 16 and then be reflected up through lens 14, and that this light can only be reflected by print 17 and mirrors 18, 18'. Further, it should be understood that print carriers have central openings of different sizes to accommodate prints of different sizes, the borders of the print carrier around the print being narrowed or widened to provide the center opening of a size to fit the particular print and center it in the holder. In all cases, the mirrors 18, 18' are placed along the edges of the central aperture adjacent the print so as to be always the same distance from the edge of the print, all for the purpose to be described hereinafter.

As seen in Fig. 1, an upstanding rack supporting member 19 is mounted on table 10 adjacent bellows 12 and slidably retains vertical lens rack 20 therein. Member 19 may be formed as a tube of rectangular cross-section which contains flanged portions at its bottom section so that it may be attached by screws to table 10. Rack 20 is formed of elongated rectangular material with a cross-sectional area slightly smaller than the inside cross-sectional area of member 19 for sliding movement therein. Extending at right angles from the lower end of rack 20 and parallel to table 10 is an arm 21 which is fixed to the lens board 13 to form a rigid link between the lens board and rack 20. Slot 22 is provided in the side of member 19 adjacent lens board 13 and affords an opening so that arm 21 may slide away from or toward table 10, thus actuating lens board 13 to move lens 14 away from or toward the print carrier 16.

Journaled on a horizontal shaft mounted between brackets 23, 23' fixed substantially on the upper portion of member 19 and adjacent the side opposite the slot 22 are a pair of integral gears 24, 24'. The smaller gear 24 extends through a rectangular slot in member 19 and meshes with rack 20, and the larger gear 24' is positioned adjacent bracket 23 so that its periphery is outwardly adjacent the side of member 19 which supports bracket 23.

A second substantially longer upstanding tube 25 of rectangular cross-section is mounted on table 10, adjacent member 19. An elongated sleeve 26, which is approximately half the length of tube 25, is slidably positioned on tube 25 and contains racks 27 and 28, longitudinally fixed along opposite sides of sleeve 26 so that rack 27 meshes with the protruding teeth of the larger gear 24'.

A reversible electric motor 29 is mounted on block 30, positioned adjacent tube 25 so that the shaft of motor 29 is on a plane which passes substantially midway the height of tube 25. As illustrated in Fig. 3, the shaft of motor 29 is connected to shaft 31 through clutch 32. Shaft 31 is journaled on spaced brackets 33, 33' on block 30, so that with axial motion of the shaft, clutch 32 may be engaged or disengaged. A wide cogwheel 34 is fixed on shaft 31 between brackets 33, 33' and engages idler gear 35 which is journaled on a separate horizontal shaft and supported by brackets from block 30 adjacent cogwheel 34, so that regardless of whether clutch 32 is engaged or disengaged, cogwheel 34 and idler gear 35 will mesh. A crank handle 36 is provided on the free end of shaft 31 so that when clutch 32 is disengaged, cogwheel 34 may be rotated by this handle; and when clutch 32 is engaged, the handle will rotate but will not interfere with the operation of motor 29. As seen in Fig. 1, idler gear 35 engages rack 28 so that upon actuation of cogwheel 34 either by motor 29 or by handle 36, sleeve 26 will be actuated to slide up and down tube 25.

A flat projection board 37, which contains a rectangular opening on the flat surface adjacent one corner thereof to allow tube 25 to extend therethrough, is mounted on the upper end of sleeve 26 parallel to table 10 and is supported by bracket 38 mounted on that sleeve. A pair of braces 39 and 39' extend upwardly from the corners of projection board 37 adjacent tube 25 to provide support for a horizontal shaft 40 fixed between the respective free ends thereof. A drum or roll 41 of sensitized paper 42 is journaled on shaft 40 so that the free end of the paper 42 may be fed through a narrow rectangular slot 43 which is provided in projection board 37 and which runs the length of the projection board parallel with the flat surfaces so that the sensitized paper may extend therethrough.

On the lower side of projection board 37, and at a position immediately above lens 14, a rectangular opening 44 is provided which communicates with the slot 43. Opening 44 allows light from the enlarger to be projected on the sensitized paper within slot 39 which is exposed by the opening. A ruby lens or glass 44' is slidably positioned at opening 44 so that the sensitized paper may be exposed when desired.

A flexible cable 45 is connected to the upper side of projection board 37 at a point adjacent tube 25 and extends over roller 46 rotatably mounted on the upper end of tube 25 and extends into the hollow section of the tube. Weight 47 is attached to the end of cable 45 in tube 25 and provides a counter-balance.

Any suitable means may be used for drawing the sensitized paper 42 through slot 43 and measuring the paper so that unexposed increments of the paper may be continually positioned at opening 44. As seen in Fig. 1, I have provided opposed parallel rollers 48 and 49, whose respective circumferences are slightly greater than the length of opening 44, in a position adjacent the end of projection board 37 and in a position to receive the free end of paper 42. When rollers 48 and 49 are rotated one revolution, the sensitized paper 42 is advanced a distance greater than the length of opening 44 and therefore on each revolution will position an unexposed section of paper at opening 44.

A support may be positioned below rollers 48 and 49 as shown in Fig. 1 and may consist of a hollow upstanding tube 50 of rectangular cross-section which has flanged sections on its lower end so that it may be retained on table 10 by screws. Tube 50 slidably journals an elongated member 51 of rectangular cross-section which is connected to projection board 37 at a point adjacent rollers 48 and 49. Tube 50 and member 51 provide lateral stability for the projection board 37 and connecting assembly but do not support the weight and therefore member 51 is free to slide in tube 50.

It is to be remembered that the weight of projection board 37 and drum 41 are centered at bracket 38 so that the substantial part of the weight is carried by tube 25 through the support of roller 46.

A novel part of my invention is the positioning of a photoelectric cell or electric eye 52 at a point adjacent opening 44 to actuate motor 29. Fig. 5 shows the electrical connection between cell 52 and motor 29 and therefore the wiring is not shown in the preceding figures. Referring to Fig. 5, I have provided a transformer 53 which is connected to an alternating current supply when the printer is to be operated. Through rectifiers 54 and 55, full wave rectification is obtained to actuate motor 29 when desired.

Assume now that a print 17 has been inserted in the print carrier 16 on the balopticon, and current is supplied to the wires leading to transformer 53. Light from lights 15, 15' is reflected and projected against opening 44. A thumb switch 56 may then be held closed to supply current to the field of motor 29 through upper limiting switch 57 which is resiliently held closed, and through poles 58, 58' which are also normally held in closed position by spring action. Motor 29 then operates to raise projection board 37 and at the same time lowers lens board 13 to keep the projected image always in focus. As projection board 37 moves away from table 10 the image projected thereon becomes larger until light reflected from mirror 18 strikes photoelectric cell 52. When the light strikes photoelectric cell 52, current is allowed to flow through amplifier tube 59 to actuate spring loaded relay 60 which functions, as shown by broken lines in Fig. 5, to break the current supplied by thumb switch 56 and reverse motor 29 by reversing its field. Thumb switch 56 may be released at any time after relay 60 is first actuated. If it is held down, projection board 37 will oscillate or hunt as relay 60 selectively supplies current reversing the field or supplies current normally. If thumb switch 56 is released, at any time after relay 60 has first been actuated, the projection board will position itself at a point where the light from aperture 18 is adjacent but not shining on photoelectric cell 52.

If another size print is used, thumb switch 56 should be reactivated and the operation repeated, because the mirrors 18, 18' will be spaced different distances from the center of the print for different size prints, and the apparatus will have to be readjusted to cause the light to be reflected by mirror 18 onto the photoelectric cell 52 to set in motion the above described operation to properly focus the image on the sensitized paper. It will be apparent to those skilled in the art that the operation of merely pressing a thumb switch to obtain a correct size image is a great improvement and will increase the speed of exposing sensitized paper. Of course, after the image is properly positioned at opening 44, the ruby lens protecting the sensitized paper positioned therebehind may be removed to expose the paper.

It should be understood that many variations in the electrical circuit shown in Fig. 5 are possible without departing from the scope of my invention. For example, a polarized reverse current normally closed relay could be placed in series with the motor field circuit to automatically break the circuit when the current is first reversed.

Upper limiting switch 57, and lower limiting switch 61 located on tube 25, are installed in the electrical circuit to stop the flow of current to the field of motor 29 at the respective upper or lower limits of rack 27 for obvious reasons.

As seen in Fig. 1, I have provided mirrors 62, 63 and 64 so that the operator, by manual operation of handle 36 with clutch 32 disengaged, may properly adjust the size of the image if the electrical circuit fails to function. When light is projected on mirror 62 it is reflected to mirror 63 and then to mirror 64. Mirror 62 is located adjacent one edge of opening 44 and reflects light in a vertical line down to mirror 63 and therefore, regardless of the height of projection board 37, mirror 62 may be seen through mirror 64. It is obvious that the same adjustments for the size of the image may be made by hand as were performed by the electrical circuit. The operator may adjust the height of projection board 37 so that light from mirror 18' appears in mirror 64; then the print is ready to be exposed.

Large quantities of prints may quickly and easily be made with little effort on the part of the operator. It should be apparent from the foregoing description that when projection board 37 is moved toward table 10, lens board 13, because of the mechanical link between rack 20 and rack 27, is simultaneously moved away from table 10 and away from the print carrier. Since the larger gear 24' is meshed with rack 23, the movement of projection board 37 is more pronounced than that of the lens board 13 and therefore always maintains the image in focus at opening 44. It should be remembered, however, that the mechanical focusing hereinafter described is not an exact focus and therefore lens 14 must have a sufficiently small aperture to provide a proper focal depth to eliminate the mechanical errors of focusing and to give a clear image throughout the travel of projection board 37.

It will be obvious to those skilled in the art that various modifications and changes may be made in the device shown and described without departing from the scope of my invention as defined in the appended claims.

I claim:

1. In an automatic sizing projector of the class described wherein light from a light source is reflected from a print carried by a print carrier thence through a lens to project an image of said print onto sensitized material carried by a projection board, the projection board and the lens being movable with respect to each other and to the print carrier to remain substantially always in focus, the combination of mirror means mounted on said print carrier in spaced relation to and adjacent one edge of said print to reflect light from said light source through said lens, a photoelectric cell mounted on said projection board in spaced relation to and adjacent one edge of said sensitized material in a position to be illuminated by said light reflected by said mirror means when said image is a predetermined size, electromechanical means connected to said lens and to said projection board to move said lens and said projection board to vary the size of said image projected onto said projection board, automatic focus means connected to said projection board and said lens to maintain said image substantially always in focus on said projection board, and a switch electrically connected to said electromechanical means to actuate said electromechanical means to move said lens and said projection board to increase the size of said image until light reflected from said mirror means shines on said photoelectric cell, said photoelectric cell being actuated by light shining on it to actuate said electromechanical means to move said lens and said projection board to decrease the size of said image, said electromechanical means being rendered inoperative when said image on said projection board is so narrowed as not to illuminate said photoelectric cell whereat said image is projected upon said photosensitive material in a preselected size.

2. The structure as claimed in claim 1 wherein a standard movably supports said projection board, and spaced limiting switches are connected to said standard and electrically connected to said electromechanical means to deactuate said electromechanical means when either of said switches is engaged by said projection board.

References Cited in the file of this patent

UNITED STATES PATENTS

| Number | Name | Date |
|---|---|---|
| 1,597,598 | Jones | Aug. 24, 1926 |
| 1,647,814 | Reyes | Nov. 1, 1927 |
| 1,781,044 | Arana | Nov. 11, 1930 |
| 2,563,892 | Waller | Aug. 14, 1951 |